Aug. 9, 1955            G. B. CLARK            2,714,819
MULTITUBE AVERAGE VELOCITY MANOMETER
Filed June 13, 1952            4 Sheets-Sheet 1
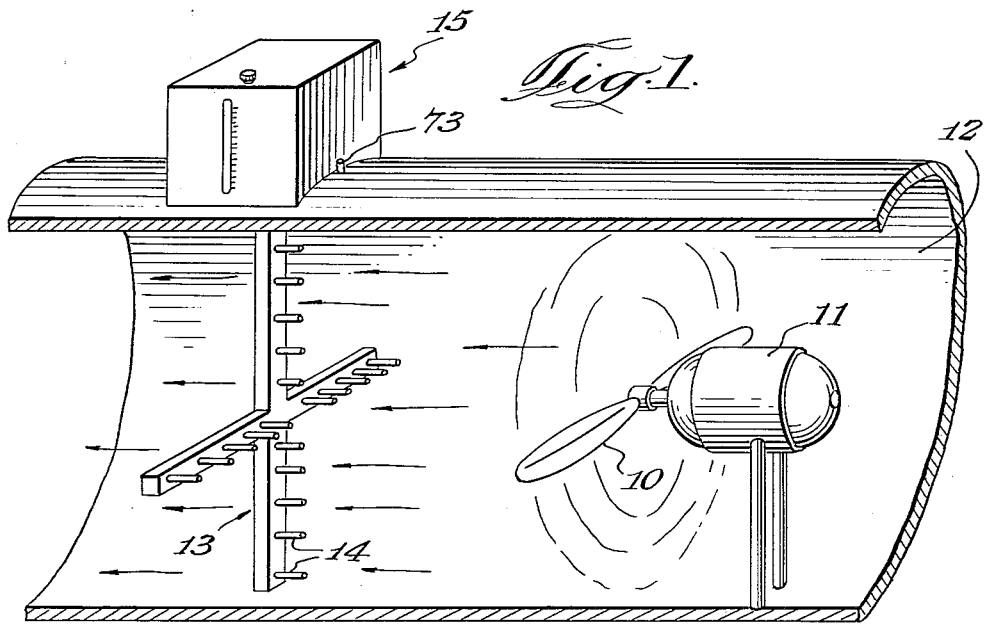
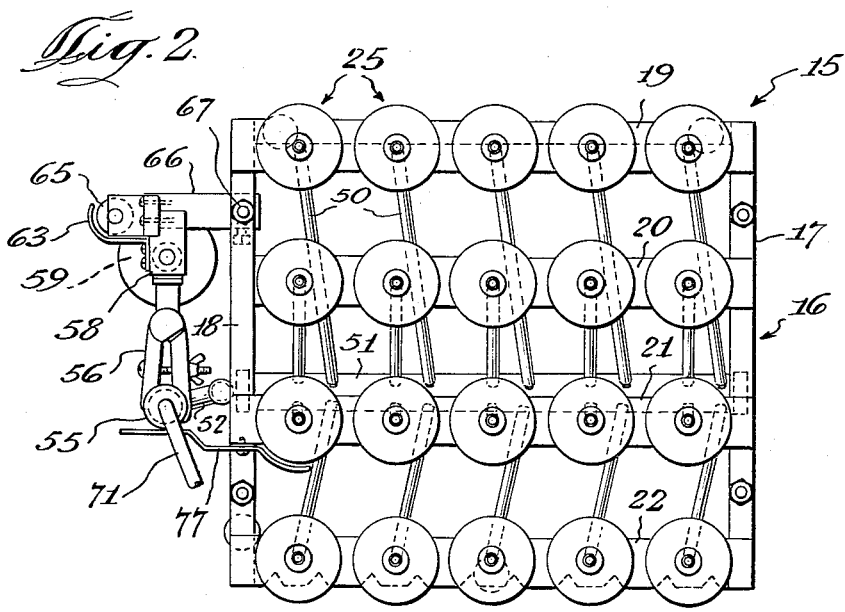
Inventor
George B. Clark
By Schroeder, Merriam, Hofgren & Brady
Attorneys Aug. 9, 1955 G. B. CLARK 2,714,819
MULTITUBE AVERAGE VELOCITY MANOMETER
Filed June 13, 1952 4 Sheets-Sheet 2
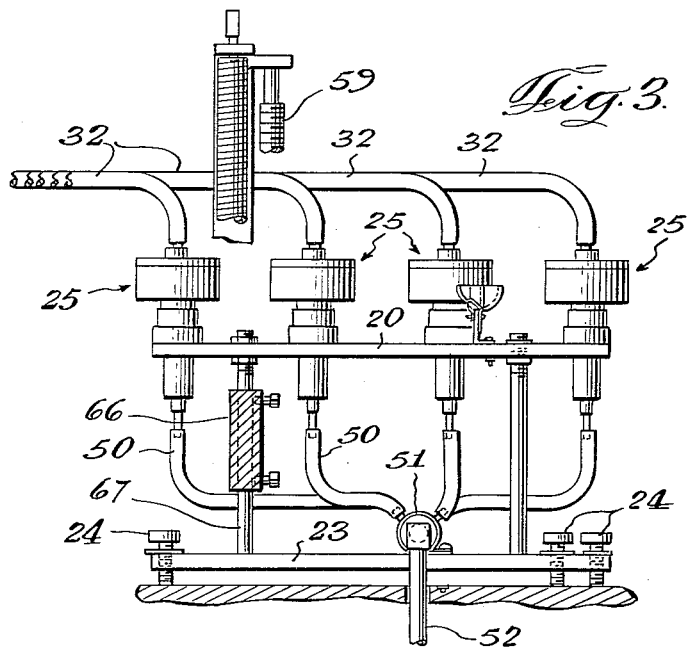
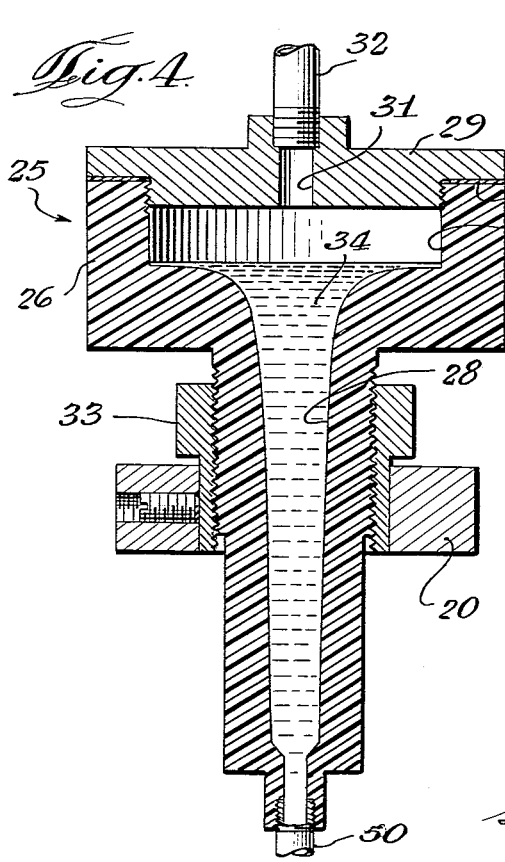
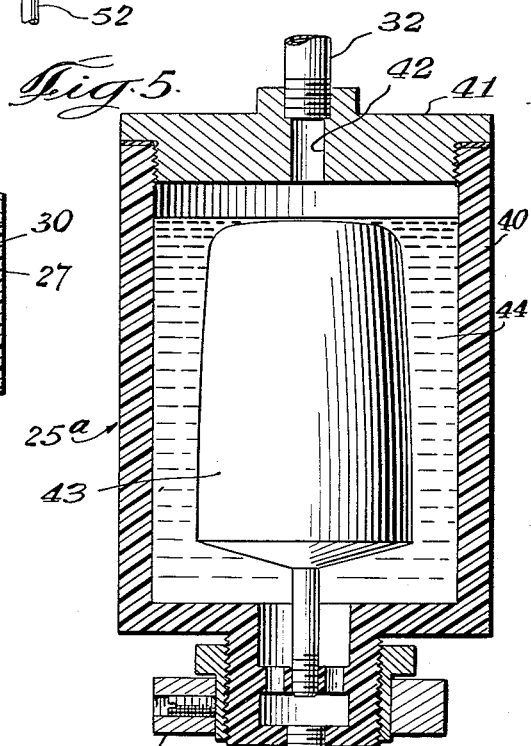
Inventor
George B. Clark
By Schroeder, Merriam, Hofgren & Brady
Attorneys

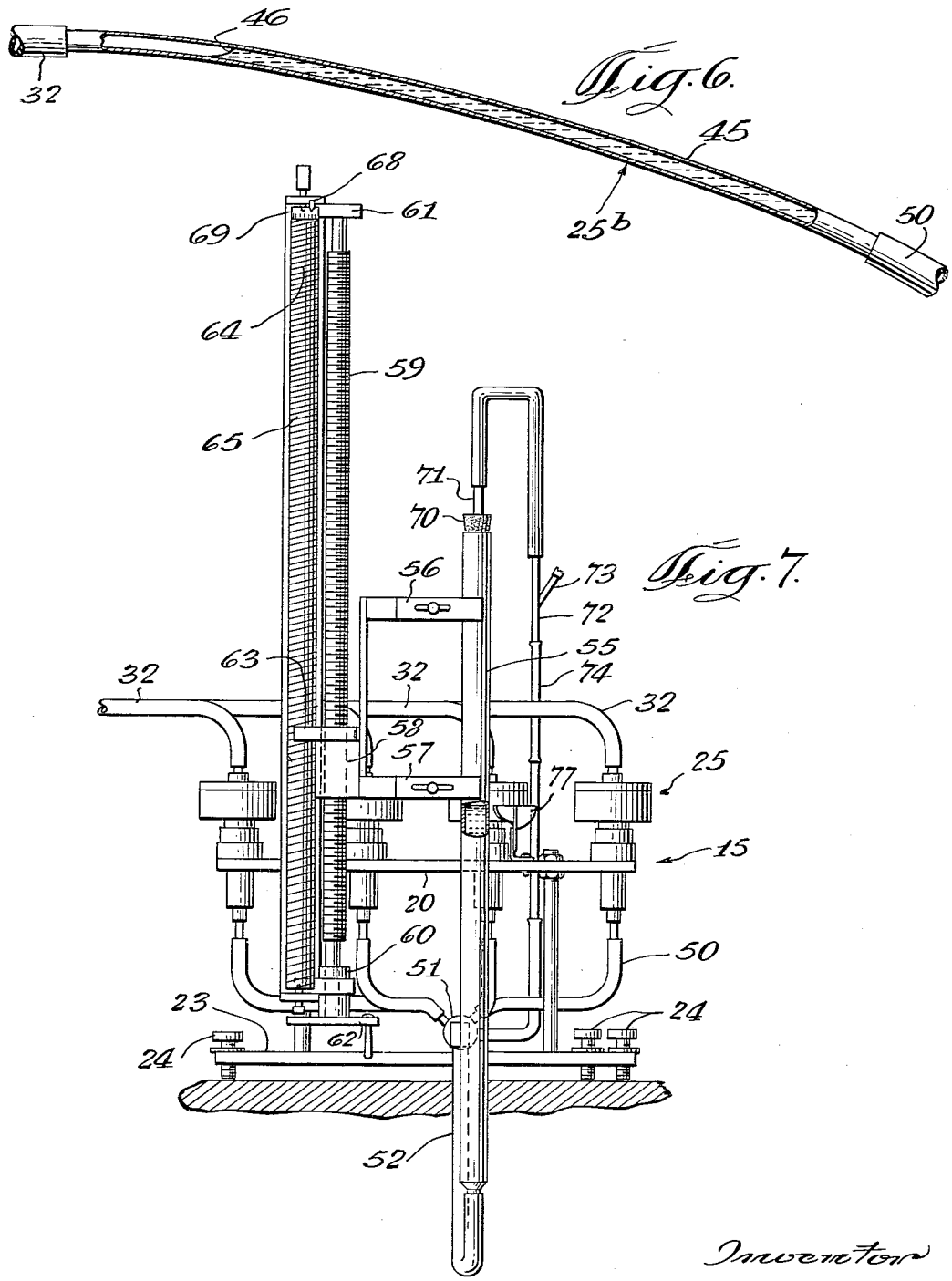

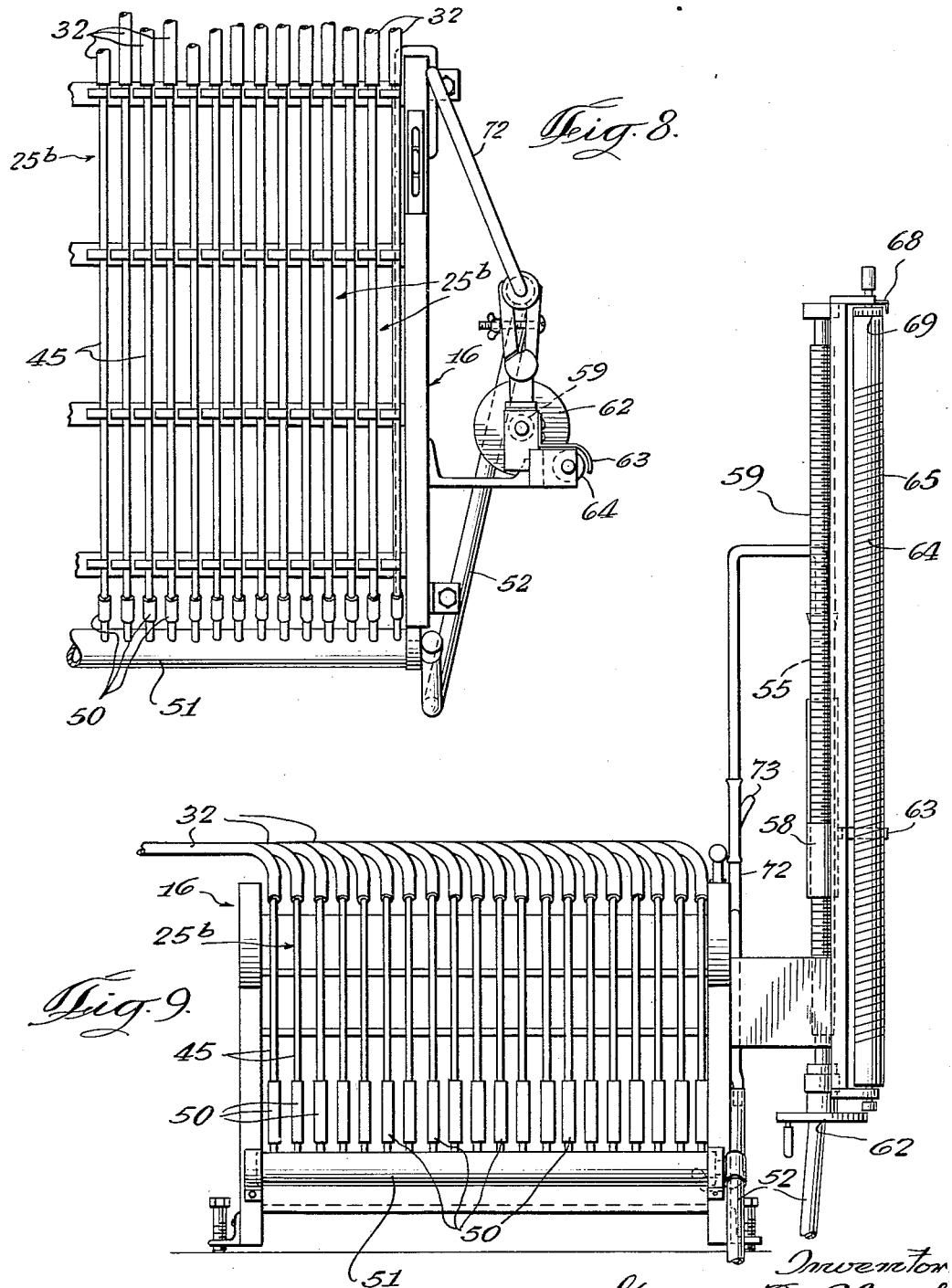

United States Patent Office 2,714,819
Patented Aug. 9, 1955

2,714,819

MULTITUBE AVERAGE VELOCITY MANOMETER

George B. Clark, Urbana, Ill.

Application June 13, 1952, Serial No. 293,362

13 Claims. (Cl. 73—212)

This invention relates to a measuring and calculating instrument and more particularly to an instrument capable of summating power functions of a plurality of conditions.

It is the general object of this invention to produce a new and improved instrument of the character described.

One of the principal features of the present invention is the provision of an instrument capable of translating each of a plurality of conditions into a power function of the condition and summating a plurality of such power functions so that the latter may be directly ascertained or read. While it will be clear to those skilled in the art that the principles of the invention are adapted to many other uses, they are particularly adapted for giving a direct reading of the average velocity of a fluid flowing through a confined space.

Fluids, such as gases, flowing through a confined space move at various velocities ranging theoretically from zero at the wall or edge portions of the space to a maximum velocity at the center. Thus in order to measure the average flow through a confined space such as a duct or wind tunnel, it is necessary that a number of readings be taken of velocities at various points transversely across the flow and then all such velocities must be averaged in order to reach the desired result. It is a further feature of this invention to provide an instrument capable of giving a direct reading of such average velocity.

A number of types of instruments are available for measuring the velocity of a fluid, for example a gas. A simple type of instrument includes an orifice through which the gas passes. In this type of instrument the pressure drop caused by the restricting effect of the orifice is known to be a function of the quantity of gas flowing through the orifice and thus the measurement of the pressure drop across a calibrated orifice will give the quantity of gas flowing therethrough from which the average velocity of the gas can be determined. Such types of instruments however are not readily adaptable to measure the velocity of all large volumes of fluid for reasons which are well known.

Another type of instrument is the vane anemometer which is, in effect, a wind driven propeller whose speed of rotation can be measured. These instruments measure the approximate amount of air passing through the whole instrument and it is capable of making flow measurements where great accuracy is not required and it is of course not adaptable to the measurement of average flow in relatively small ducts.

A further form of instrumentation is the hot wire anemometer. In this instrument a small length of platinum wire is included in a bridge circuit so that its resistance can be accurately measured. The heated platinum wire is placed in the air stream and the amount of electric current necessary to maintain the temperature of the wire against the cooling effect of the moving fluid is measured. The current necessary is of course a function of the velocity of the fluid.

A much more common type of instrument is the Pitot tube which includes basically a bent tube containing liquid, with both ends of the tube being subjected to static or atmospheric pressure, while one of the ends is also subjected to the velocity pressure of the fluid. The cumulative effect of the static and velocity pressure on one end of the tube raises the liquid in the bent portion of the tube and the velocity of the fluid can then be computed using the following formula;

(1) $$V = 1097.4 \sqrt{\frac{h_i}{w}}$$

where $V$ is the velocity in feet per minute, $h_i$ is the velocity pressure in inches water gauge, and $w$ is the weight of air in pounds per cubic foot.

In using Pitot tubes to determine the average velocity of air flowing through a duct, measurement is taken of the velocities at a sufficient number of points so that the average of these readings gives a close approximation of the average velocity of the air flowing through the duct. Standards have been established for the taking of such readings and that prescribed by N. A. F. M. (National Association of Fan Manufacturers) is that twenty such readings should be made transversely of the air flowing through the duct. Using twenty readings the individual velocity at each reading point can be calculated in feet per minute by use of Formula 1 and the average velocity is then determined as follows:

(2)
$$V_{av} = \frac{V_1 + V_2 + V_3 + \ldots V_n}{n} = \frac{1097.4}{\sqrt{wn}} (\sqrt{h_1} + \sqrt{h_2} + \sqrt{h_3} + \ldots \sqrt{h_n})$$

(3) $$V_{av} = \frac{1097.4}{\sqrt{wn}} \sum_{i=n}^{1} \sqrt{h_i}$$

It will be noted from Formula 3 that the quantity to the left of the summation sign is constant for a given psychrometric condition of the air at the time the observation is made. Thus these factors can, in the particular instrument of the design of this invention, properly be calibrated upon a suitable scale. The quantity to the right of the summation sign is of course a power function of $h_i$ in this particular case the square root of $h_1$. Inasmuch as, as previously noted, the instrument of this invention is capable of summating a plurality of power functions (for example, summating powers which may be characterized by $$h_i^{\frac{1}{n}}$$

where $n$ is greater than zero) and inasmuch as the quantity in front of the summation sign of Formula 3 can be calibrated upon a suitable scale, the instrument of this invention can be utilized to give direct readings of the average velocity of air or other gas or fluid flowing through a confined space or duct.

Other features and advantages of the invention will be readily apparent from the following description and drawings, in which:

Fig. 1 is an elevational view of an air duct system, partially broken away for clarity of illustration, and illustrating a portion of the apparatus of the invention;

Fig. 2 is a top plan view of one form of an instrument embodying the invention;

Fig. 3 is a side elevational view of a portion of the instrument shown in Fig. 2;

Fig. 4 is an enlarged vertical sectional view of a first form of container usable with the apparatus of the invention;

Fig. 5 is an enlarged vertical sectional view of a second form of container usable with the apparatus of the invention;

Fig. 6 is an enlarged vertical sectional view of a third form of container usable with the apparatus of the invention;

Fig. 7 is a view like Fig. 3 showing details of the scale holding and moving mechanism;

Fig. 8 is a view like Fig. 2 of a modified form of the invention; and

Fig. 9 is a side elevational view of the apparatus shown in Fig. 8.

While this invention is susceptible of embodiments in many different forms, there are shown in the drawings and will herein be described in detail three specific embodiments, with the understanding that the present disclosure is to be considered as an exemplification of the principles of the invention and is not intended to limit the invention to the embodiments illustrated. The scope of the invention will be pointed out in the appended claims.

In the particular embodiment of the invention chosen for illustration, the instrument has been designed to give a direct reading of the average flow of air through a duct. Thus as shown in Fig. 1 there is shown a propeller 10 driven by a motor 11 mounted within a suitable round duct 12 for moving air through the duct in the direction shown by the arrows. A framework 13 carries a plurality of tubes 14, here illustrated as being mounted in accordance with N. A. F. M. specifications, wherein the tubes are spaced across the duct so that each tube represents a quadrant equal in area to the quadrants of other tubes, with the tubes each having an open end facing counter to the direction of air flow through the tunnel. Inasmuch as the tubes are not spaced equally across the duct, the average obtained by the instrument of the present invention is a true average flow rather than a relative volume. The tubes on the framework form a part of the average velocity measuring instrument 15 which may be mounted on top of the duct as shown in Fig. 1 or in any other convenient spot.

As shown in Figs. 2, 3 and 7, the measuring instrument includes a frame 16 having top side members 17 and 18, a plurality of supporting members 19, 20, 21 and 22 extending transversely across the frame between the sides thereof, all of which are supported upon a base member 23 provided with suitable adjustment screws indicated at 24 for leveling the frame.

Mounted in a common horizontal plane on the supporting members is a plurality of containers 25 which are similar in design and one form of which is illustrated in Fig. 4. Referring to that figure it will be noted that the container 25 is provided with a body portion 26 formed on the interior thereof into a right cylindrical chamber 27 with the lower portion 28 of the body member being substantially funnel shaped and communicating with the cylindrical portion 27. A cover 29 is threadedly secured on the body portion and a gasket 30 is provided therebetween to insure a fluid-tight fit. The top of the cover is provided with an opening 31 opening into the cylindrical portion 27 and adapted to receive a tube 32, the other end of which is connected to one of the tubes 14 mounted on the framework 13 in the wind tunnel. A collar 33 threadedly engages each container with each collar being adjustably held in a supporting member by set screws so that each container may be properly and individually leveled, with the threads on each collar permitting individual vertical adjustment of its associated container.

It will be noted that twenty containers 25 are provided on the frame, each connected to a different one of the tubes 14 in the wind tunnel so that liquid 34, such as oil or the like, within the container is subjected to the velocity pressure generated by the air moving through the wind tunnel. It will of course be understood that the pressures generated by the air moving through the tunnel is the total of the velocity pressure plus the static pressure, but inasmuch as the static pressure is canceled out by means hereinafter to be described, such pressures will be referred to hereinafter as the velocity pressure.

The configuration of the funnel shaped portion 28 of each container 25 is such that the volume of such portions above any horizontal plane passing therethrough varies as the square root of the distance between such planes and the top of the level of the liquid therein. Thus the amount of liquid displaced from the shaped portion 28 by the velocity pressure exerted through the tube 32 varies as the square root of such velocity pressure. Expressed in another way the quantity of liquid displaced from the container by the velocity pressure is equal to $\sqrt{h_1}$.

Communicating with the bottom of each of the containers 25 are conduits 50 which connect with a common reservoir 51 so that there is delivered into the reservoir the total fluid displaced from each of the containers, with the amount displaced from each of the containers differing in accordance with the conditions met at the tube 14 to which such container is connected.

A passageway in the form of a flexible conduit 52 provides fluid communication between the reservoir and a receptacle for fluid displaced from the reservoir, with the receptacle taking the form of a transparent tube 55 vertically mounted on the frame 16. For this purpose the tube is held in a pair of brackets 56 and 57 secured to a nut 58 threadedly engaging a threaded shaft 59 rotatably mounted in bearing members 60 and 61 and adapted to be rotated by a hand wheel 62 so as to raise and lower the transparent tube 55. The nut portion 58 carries an indicating finger 63 adapted to overlie a scale 65 rotatably mounted on the frame. The tube, shaft and scale assembly is held in the frame by means of a bracket 66 slidably mounted on a rod 67 fixed to the frame and securable thereto at a plurality of positions by the set screws shown.

The scale 65 is calibrated in two coordinates, one being velocity in feet per minute (taking into account the constant 1097.4) and indicated by the slanted scribe marks 64 and the other being equal to $w$. The scale is provided with suitable indicating means 68 at its top with the indicating means being located adjacent a scale 69 suitably scribed to indicate the value of $w$ (which can readily be calculated in advance, taking into account the barometric pressure and the water vapor present in the air). The scale may be rotated to position the indicating means 68 on the scale 69 at a point corresponding to the correct value of $w$ so that the indicator 63 is properly positioned relative to the scribe lines 64 to give direct readings of the average velocity.

The upper part of the tube 55 is connected to the static pressure existing within the duct or tunnel 12 and to this end is provided with a stopper or corp 70 having a suitable aperture through which a small tube 71 extends which is connected to a branch member 72, one fork 73 of which is connected with a suitable small opening in the side walls of the tunnel 12 so as to subject the branch 73 to the static pressure existing within the duct. Only one such branch 73 is provided, it being assumed that the static pressure will be constant across the duct at the location of tubes 14. The other fork of the branch member 72 connects with a relatively fine tubing 74 connected at its lower end to reservoir 51. A relatively tiny column of liquid is maintained in the tube 74 for the purposes of providing more accurate measurement as hereinafter to be described.

It is believed that it will be apparent from the foregoing that a separate container, which may take a number of alternative forms (several of which are hereinafter described), is connected through tubing 32 to each of the tubes 14 located within the duct and exposed to the pressure of the air moving therethrough so as to generate a pressure within the container which is proportional to the velocity pressure of the air. Such pressure transmitted to the top of the containers displaces liquid from each of the containers, with the amount of the liquid being displaced varying as the square root of the velocity pressure. The total liquid so displaced from each of the containers is utilized to determine the average velocity of the air flowing through the duct. A direct measurement of the volume of fluid so displaced would provide of course the indicia of the average velocity. However, to provide a simple direct reading instrument the quantity so displaced is directed into the fluid system including the conduits 50, reservoir 51, conduit 52 and transparent tube 55 so as to cause the liquid within the tube 55 to be moved vertically upwardly and such movement is utilized to determine the average velocity.

When using the instrument the frame 16 is first brought to level position by the leveling screws 24 and suitable bubble levels may be used to indicate when the frame is in proper horizontal position. The tube 55 is then moved upwardly or downwardly vertically until the level of the liquid therein lies in the same horizontal plane as the level of the liquid within the containers 25. For this purpose a suitable indicator such as the indicator 77 may be used, the indicator consisting simply of an arm or bar having a portion immediately adjacent the transparent tube 55 and another portion adjacent one of the containers 25 (which for this purpose may be of transparent material) so that the oil level in both the tube and containers can be brought to the height of the indicator. The scale 65 is then rotated to position the same to correspond to the weight per cubic foot of air, that is to the factor $\sqrt{w}$ in the formulas given. With the instrument so arranged it is in condition to measure and give a direct reading of the velocity of air flowing through the duct. The motor 11 may now be started to force the flow of air through the duct 12 and against the ends of the tubes 14. The velocity pressures generated at the location of the open end of each of the tubes 14 is transmitted by the tubes 32 to the top of a different one of the containers 25 and thus such velocity pressure serves to displace fluid from each of the containers 25, with the volume being displaced varying as the square root of the velocity pressure. Such displacement of liquid from each of the containers 25 causes a rise in the level of the liquid within two tubes 55 and 74.

It should be noted at this point that merely to read the rise of the liquid level within the tube 55 would not give a completely accurate picture of the total amount of fluid displaced from each of the containers by the velocity pressure inasmuch as a rise in the level increases the hydrostatic head of liquid in the tube which serves to offset the velocity pressure transmitted to each of the containers 25. In order to eliminate the hydrostatic head, a null method of measuring is employed. Thus when the liquid level within the tube 55 and each of the containers was brought to the same initial starting (zero) point through the use of the level indicator 77, note is made as to this position of the indicator finger 63 on the scale 64. After the flow of air has started through the duct and the liquid level has risen within the tube 55, the hand wheel 62 is rotated to lower the tube. Such lowering of the tube of course increases the volume of the fluid system including the tube and the conduits 50 and 52 beneath the liquid level and thus as the tube is lowered the liquid level therein slowly falls. Depression of the tube is continued until the liquid level therein is again precisely opposite the level indicator 77 so that the same hydrostatic head resisting the velocity pressure is present in the system. At this point the scale 65 is again read opposite the indicator 63 and the distance of movement of the indicator 63 required again to bring the liquid level to the indicating means 77 provides a direct reading of the average velocity within the duct.

The purpose of the tube 74 is to assist in bringing the liquid level in the tube 55 back to the zero or null point.

In some cases it may be difficult to determine the precise level of the liquid within the transparent tube 55 due to the diameter of the tube. The tube 74, however, is extremely small in diameter so as to have only a thin column of liquid therein, the level of which is readily ascertained, and of course when the level of the liquid within the tube 74 is brought back to the zero point, as indicated by the indicator 77, the level of the liquid within the tube 55 is also at the zero point. Thus in effect the tube 74 functions as a precision leveling scale or indicator for the tube 55, with the volume of liquid within the tube 74 being a relatively insignificant amount. No effect on the over-all measuring ability of the instrument is caused thereby because of the null method used.

The containers 25 may take any one of a number of forms, three of which are illustrated herein, and regardless of the type of container used the other parts of the apparatus are essentially the same; and in describing the apparatus as used with the several forms of containers, the same reference numerals will be associated with similar parts.

Each of the containers is designed to the following formula.

(4) $$Q = K\sqrt{h}$$

where Q is the quantity of oil displaced, K is a constant of proportionality and h is the height of oil displaced (velocity pressure).

There are illustrated three types of manometric tubes which will fulfill this requirement.

I. Volume of revolution (shown in Fig. 4):
Differentiating (4), (5) $$dQ = \tfrac{1}{2} K h^{-\tfrac{1}{2}} dh$$

Also, for any infinitesimal height the volume is (6) $$dQ = \pi r^2 dh$$

Equating (5) and (6) and solving for r, the variable radius of the required volume of revolution is (7) $$r = \sqrt{\frac{K}{2\pi}} \cdot \frac{1}{h^{\tfrac{1}{4}}}$$

This is the equation of the required curve.

This hyperbola is asymptotic to both the h and r axes which introduces a difficulty in the design of a manometer which will cover the range of velocities desired, i. e., from zero to some appropriate fixed value. It is seen that the integral (8) $$Q = \int_0^{h_2} \pi r^2 dh$$

does not exist. However, an integral from a very small lower limit, does exist:

(9) $$Q = \int_{h_1}^{h_2} \pi r^2 dh$$

For actual mechanical design of the particular instrument shown, the lower limit was made equal to 0.01 inch, which meant that the upper portion 27 of the container is made as a right circular cylinder of equivalent volume required, by (4) and the remaining portion 28 of the tube designed according to Equation 7. Depressions of oil within the circular cylindrical portion 27 do not give correct readings (up to about 400 feet per minute for 0.075 air). However, readings taken above this velocity are correct.

In Fig. 5 a second form of container 25a is shown which comprises a substantially cylindrical container 40 having a cover member 41 provided with an opening 42 communicating with one of the tubes 32 and with a core member 43 immersed in the liquid 44 therein, with the core member being so shaped again as to comply with Formula 4. With regard to the container 25a of Fig. 5, the differential volume is

(10) $$dQ = \pi(r_1^2 - r^2)dh$$

Equating with (5) and solving for $r$.

(11) $$r = \sqrt{r_1^2 - \frac{K}{2\pi h^{1/2}}}$$

As the integral (8) does not exist and similar provisions must be made in the design of the core 43, i. e., choice of a very small lower limit for $h$.

A third form of container which may be used is indicated at 25b in Fig. 6 which comprises a small bore tube 45 having an internal diameter of about .087" and which is bent in a vertical plane so that the volume of liquid within the tube above any horizontal plane passing therethrough varies as the square root of the distance between such plane and the horizontal plane passing through the top of the tube. The bore of the tube is relatively small so that the surface 46 of the liquid therein may be assumed to remain perpendicular to the axis of the tube. With this design the volume of liquid displaced is proportional to the length of the tube so that

(12) $$dQ = K_1 \sqrt{(dx)^2 + (dh)^2}$$

Equating with (5)

(13) $$\frac{K^2(dh)^2}{4h} = (dx)^2 + (dh)^2$$

(14) $$dx = \sqrt{\frac{K^2}{4h} - 1} \cdot dh$$

or, by integration

(15) $$x = \sqrt{h}\sqrt{\frac{K^2}{4} - h} + \frac{K^2}{4}\sin^{-1}\frac{2h}{K} + C$$

If the curve is assumed to go through the origin, the constant C is zero.

Equation 15 gives a whole family of curves. A given curve is obtained by assigning a value to K. It is noted that the curve does not exist for negative values of $h$ or for values of $h$ larger than $$\frac{K^2}{4}$$

The upper limiting value of the family of curves is found by setting $$\frac{K^2}{4} = h$$

Equation 15 becomes

(16) $$x = h\sin^{-1}(1) = h\frac{\pi}{2}$$

An example of an instrument utilizing the bent tube form of Fig. 6 is shown in Figs. 8 and 9. As seen therein a plurality of such containers 25b are mounted in a frame 16 and connected at their upper ends to the tubes 32, each of which of course is connected to a different one of the tubes 14. The lower ends of the containers are each connected to a different one of the conduits 50 which, in turn, are connected to the reservoir 51. The connection between the reservoir and the measuring tube 55 and the operation of the tube 55 and scale are similar to that previously described.

I claim:

1. In a fluid velocity measuring instrument having a plurality of means positioned in the path of fluid flow each adapted to transmit pressure as a function of the velocity of fluid flow thereat; means for averaging the velocity of said flow comprising a plurality of containers having liquid therein at a common liquid level, with each of the containers being connected to a different one of the pressure transmitting means to subject the liquid therein to said pressure and thereby to displace liquid from said containers, with each container being shaped to cause the displacement of liquid therefrom in volumes which are a power of the pressures transmitted thereto; a receptacle in liquid communication with each of said containers to receive liquid in a volume equal to the total amount of liquid so displaced; means for vertically adjusting the receptacle; and indexing means associated with said receptacle and said containers to provide a reference for adjusting said receptacle to equalize the level of the liquid in said containers and the receptacle before and in said receptacle after liquid is displaced from the containers by said pressure.

2. An instrument for summating a power function of a plurality of conditions comprising a plurality of containers having liquid therein with each container being graduated in volume between successive horizontal planes in accordance with said power function, a plurality of means each responsive to a different one of said conditions and each operative to displace liquid from a different one of the containers, whereby the volume of displaced liquid varies as the power function of the condition; and means for effecting the desired summation measurement by use of the total of the volumes of liquid so displaced.

3. In an instrument for measuring velocity of a stream of gas flowing through a confined space and having a plurality of tubes opening at one end counter to said stream, with said openings being spaced across said stream, means for averaging the velocity of said flow comprising a plurality of containers having liquid therein with each container being graduated in volume in successive horizontal planes whereby the volume of fluid displaced by variations in the liquid level are a power of such variations; means for connecting the top of each container to a different one of said tubes; a receptacle in liquid communication with each of said containers to receive liquid in a volume equal to the amount of liquid displaced from the containers by gas velocity pressure applied thereto through the tubes; means for vertically adjusting the receptacle; indexing means having portions adjacent said receptacle and said containers to provide a reference for adjusting said receptacle to equalize the level of the liquid in said containers and the receptacle before and in said receptacle after liquid is displaced from the containers by said pressure; and a scale provided with indices to be selected in accordance with the amount of liquid in the receptacle for indicating the velocity by the volume of liquid displaced into the receptacle.

4. In an instrument for measuring the velocity of a stream of gas flowing through a confined space having a plurality of tubes opening at one end counter to said stream, with said openings being spaced across said stream, means for providing a direct reading of the average flow velocity across said space comprising a frame; a plurality of containers mounted in the frame in a horizontal plane and with each container being so shaped from top to bottom of the operative portion thereof to have a volumetric capacity in successive horizontal planes varying as the square root of the distance from any such plane to the top of the container; means for connecting the top of each container to a different one of said tubes; a receptacle in liquid communication with each of said containers to receive liquid in a volume equal to the amount of liquid displaced from the containers by gas velocity pressure applied thereto through the tubes; means for vertically adjusting the receptacle; indexing means having portions adjacent said receptacle and said containers to provide a reference for adjusting said receptacle to equalize the level of the liquid in said containers and the receptacle before and in said receptacle after liquid is displaced from the containers by said pressure; and a scale provided with indices to be selected in accordance with the amount of liquid in the receptacle for indicating the velocity by the volume of liquid displaced into the receptacle.

5. In an instrument for measuring the velocity of a stream of gas flowing through a confined space having a plurality of tubes opening at one end counter to said stream, with said openings being spaced across said stream, means for providing a direct reading of the average flow velocity across said space comprising a frame; a plurality of containers mounted in the frame in a common horizontal plane and with each container being so constructed and arranged from top to bottom so that the volumetric capacity of the container above any horizontal plane passing therethrough varies as the square root of the distance between such plane and the top of the container; means for connecting each container to a different one of said tubes; a receptacle in liquid communication with each of said containers to receive liquid in a volume equal to the amount of liquid displaced from the containers by gas velocity pressure applied thereto through the tubes; means for vertically adjusting the receptacle; indexing means having portions adjacent said receptacle and said containers to provide a reference for adjusting said receptacle to equalize the level of the liquid in said containers and the receptacle before and in said receptacle after liquid is displaced from the containers by said pressure; and a scale provided with indices to be selected in accordance with the amount of liquid in the receptacle for indicating the velocity by the volume of liquid displaced into the receptacle.

6. The instrument of claim 5 in which each of said containers is cylindrical in shape and including a core member in the container circular in cross section and tapering outwardly from top to bottom to reduce the volumetric capacity of the container in successively lower horizontal planes as the square root of the distance between any such plane and the top of the core member.

7. The instrument of claim 5 in which each of said containers is substantially pipe shaped and bent in a vertical plane in the form of a curve.

8. The instrument of claim 5 in which each of said containers is substantially in the shape of a funnel tapering inwardly from top to bottom.

9. In an instrument for measuring the velocity of a stream of gas flowing through a confined space having a plurality of tubes opening at one end counter to said stream, with said openings being spaced across said stream, means for providing a direct reading of the average flow velocity across said space comprising a frame; a plurality of containers mounted in the frame in a common horizontal plane and with each container being connected at its top to a different one of said tubes and being so constructed and arranged from top to bottom so that the volumetric capacity of the container above any horizontal plane passing therethrough varies as the square root of the distance between such plane and the top of the container; a receptacle in the form of a vertical transparent tube; a fluid reservoir; conduits connecting the bottom of each of the containers to the reservoir; a fluid passageway connecting the reservoir to the bottom of the transparent tube; means for vertically moving the transparent tube; indexing means on the frame and positioned to provide a reference for adjusting said tube to equalize the level of the liquid in said containers and the tube before and after liquid is displaced from the containers by said pressure; and a scale mounted adjacent the transparent tube for measuring the volume of liquid displaced thereinto.

10. In an instrument for measuring the velocity of a stream of gas flowing through a confined space having a plurality of tubes opening at one end counter to said stream, with said openings being spaced across said stream, means for providing a direct reading of the average flow velocity across said space comprising a frame; a plurality of containers mounted in the frame in a common horizontal plane and with each container being connected at its top to a different one of said tubes and being so constructed and arranged from top to bottom so that the volumetric capacity of the container above any horizontal plane passing therethrough varies as the square root of the distance between such plane and the top of the container; a receptacle in the form of a vertical transparent tube; a fluid reservoir; conduits connecting the bottom of each of the containers to the reservoir; a fluid passageway connecting the reservoir to the bottom of the transparent tube; means for vertically moving the transparent tube; indexing means in the frame and positioned to provide a reference for adjusting said tube to equalize the level of the liquid in said containers and the tube before and after liquid is displaced from the containers by said pressure; and a two coordinate scale vertically arranged adjacent the transparent tube with one of the ordinates of the scale being calibrated in velocity and with the other of the ordinates being calibrated to indicate the weight of air.

11. In an instrument for measuring the velocity of a stream of gas flowing through a confined space having a plurality of tubes opening at one end counter to said stream, with said openings being spaced across said stream, means for providing a direct reading of the average flow velocity across said space comprising a frame; a plurality of transparent containers mounted in the frame in a common horizontal plane and with each container being connected at its top to a different one of said tubes and being so constructed and arranged from top to bottom so that the volumetric capacity of the container above any horizontal plane passing therethrough varies as the square root of the distance between such plane and the top of the container; a receptacle in the form of a vertical transparent tube movably mounted on the frame; means connecting the top of the tube with atmospheric pressure; a fluid revervoir in the frame; conduits connecting the bottom of each of the containers to the reservoir; a fluid passageway connecting the reservoir to the bottom of the transparent tube; means for vertically moving the transparent tube; an indicator on the frame having a portion adjacent at least one of the containers and another portion adjacent the transparent tube and adapted to indicate a common liquid level in the tube and containers; and a two coordinate scale vertically arranged adjacent the transparent tube with one of the ordinates of the scale being calibrated in velocity and with the other of the ordinates being calibrated to indicate the weight of air.

12. In an instrument for measuring the velocity of a stream of gas flowing through a confined space having a plurality of tubes opening at one end counter to said stream, with said openings being spaced across said stream, means for providing a direct reading of the average flow velocity across said space comprising a frame; a plurality of containers mounted in the frame in a common horizontal plane and with each container being connected at its top to a different one of said tubes and being so constructed and arranged from top to bottom so that the volumetric capacity of the container above any horizontal plane passing therethrough varies at the square root of the distance between such plane and the top of the container; a receptacle in the form of a vertical transparent tube movably mounted on the frame; means connecting the top of the tube to the static pressure in said space; a fine tube vertically mounted on the frame; a fluid reservoir in the frame; conduits connecting the bottom of each of the containers to the reservoir; separate fluid passageways connecting the bottom of each of the tubes to the reservoir; indicating means on the frame for aligning the liquid level in said containers with the level in the tubes; means for vertically moving the transparent tube; and a two coordinate scale vertically arranged adjacent the transparent tube with one of the ordinates of the scale being calibrated in velocity and with the other of the ordinates being calibrated to indicate the weight of air.

13. A fluid velocity measuring instrument comprising a plurality of means for transmitting pressure as a function of the velocity of fluid flow; a plurality of containers having liquid therein with each of the containers being connected to a different one of the pressure transmitting means to subject the liquid therein to said pressure and thereby displace liquid from said containers; with each of said containers being shaped to cause the displacement of liquid therefrom in volumes which are a power of pressures transmitted thereto; a fluid system including a receptacle in liquid communication with each of said containers whereby the level of liquid in said receptacle rises from a starting point upon the displacement of fluid from said containers; means for increasing the volume of said fluid system to return the level of liquid in the receptacle to said starting point; and means for measuring said increase in volume to provide a determination of the average velocity of said fluid flow.

References Cited in the file of this patent

UNITED STATES PATENTS

| | | |
|---|---|---|
| 1,274,101 | Spitzglass | July 30, 1918 |
| 1,584,860 | Huff | May 18, 1926 |
| 1,645,449 | Probebstel | Oct. 11, 1927 |
| 1,900,823 | Lang | Mar. 7, 1933 |
| 2,389,508 | Hejduk | Nov. 20, 1945 |
| 2,473,717 | Markson | June 21, 1949 |
| 2,551,526 | Campbell | May 1, 1951 |

FOREIGN PATENTS

| | | |
|---|---|---|
| 407,441 | Germany | Mar. 28, 1923 |
| 470,819 | Germany | Jan. 10, 1929 |